United States Patent

Watanabe

[11] Patent Number: 5,908,101
[45] Date of Patent: Jun. 1, 1999

[54] APPARATUS FOR TRANSMITTING POWER FROM A MOTOR TO A MOVABLE MEMBER

[75] Inventor: Mitsuhiro Watanabe, Yamanashi-ken, Japan

[73] Assignee: Mitsui Kinzoku Kogyo Kabushiki Kaisha, Tokyo, Japan

[21] Appl. No.: 08/906,973

[22] Filed: Aug. 6, 1997

[30] Foreign Application Priority Data

Aug. 6, 1996 [JP] Japan .................................. 8-223037

[51] Int. Cl.⁶ ............................ F16D 67/00; F16D 13/04
[52] U.S. Cl. .............................................. 192/223; 192/15
[58] Field of Search .................................. 192/8 R, 8 A, 192/15, 17 R, 54.5, 39, 223

[56] References Cited

U.S. PATENT DOCUMENTS

| | | | |
|---|---|---|---|
| 4,253,556 | 3/1981 | Zindler | 192/17 R |
| 4,645,050 | 2/1987 | Ingenhoven | 192/54.5 X |
| 4,966,266 | 10/1990 | Yamada et al. | |
| 5,248,017 | 9/1993 | Scharzbich | 192/8 R |
| 5,570,765 | 11/1996 | Patridge | 192/15 |
| 5,579,878 | 12/1996 | Hsieh | 192/8 R |

*Primary Examiner*—Charles A. Marmor
*Assistant Examiner*—Brandon C. Stallman
*Attorney, Agent, or Firm*—Browdy and Neimark

[57] ABSTRACT

An apparatus for transmitting power from a motor to a movable member comprises a drum connected to the movable member, a cam member rotated around a center shaft by the motor, a clutch member displaced from a standby position to a full engagement position through an initial engagement position when the cam member is rotated, a return spring for urging the clutch member from the full engagement position toward the standby position, and a brake member for applying a predetermined frictional resistance to the clutch member. The clutch member moves the brake member from a braking position to a non-braking position when the clutch member is moved from the initial engagement position toward the full engagement position. The cam member has a cam face which moves the clutch member from the standby position to the full engagement position and a holding face which disables the clutch member from returning from the full engagement position to the standby position.

6 Claims, 6 Drawing Sheets

5,908,101

APPARATUS FOR TRANSMITTING POWER FROM A MOTOR TO A MOVABLE MEMBER

FIELD OF THE INVENTION

The present invention relates to an apparatus for transmitting power from an electric motor to a movable member such as a vehicle door and window glass.

DESCRIPTION OF THE PRIOR ART

A conventional power transmitting apparatus provided between a motor and a movable member, such as a vehicle door, window glass, vehicle door lock and so on, comprises as disclosed in U.S. Pat. No. 4,966,266, a first member (10) connected to the movable member; a second member (6) rotated around a center shaft by the power of the motor; and a clutch member (20) for transmitting the rotation of the second member (6) to the first member (10) by the engagement with the first member (10). The clutch member (20) is displaced from a standby position where the clutch member (20) is not engaged with the first member (10) to an engagement position where the clutch member (20) is engaged with the first member (10), when the second member (6) is rotated by the motor. The prior art apparatus further comprises a return spring (22) for urging the clutch member (20) from the engagement position toward the standby position; and a brake member (69) for supplying a predetermined frictional resistance to the clutch member (20) so that the clutch member (20) is able to be displaced from the standby position to the engagement position by the rotation of the second member (6) against the resilient force of the return spring (22).

The problem with the conventional power transmitting apparatus is that the brake member (69) continuously supplies the frictional resistance to the clutch member (20) even after the clutch member (20) is engaged with the first member (10) by the power of the motor. Since the frictional resistance given to the clutch member (20) is equal to the rotational resistance to the motor, the motor output decreases.

SUMMARY OF THE INVENTION

The present invention was made to solve the above problem, and accordingly an object thereof is to provide a power transmitting apparatus in which the clutch member is not subjected to a frictional resistance of the brake member after the clutch member is engaged with the first member (a drum).

DETAILED DESCRIPTION OF THE PREFERRED EMBODIMENTS

Figure 1:
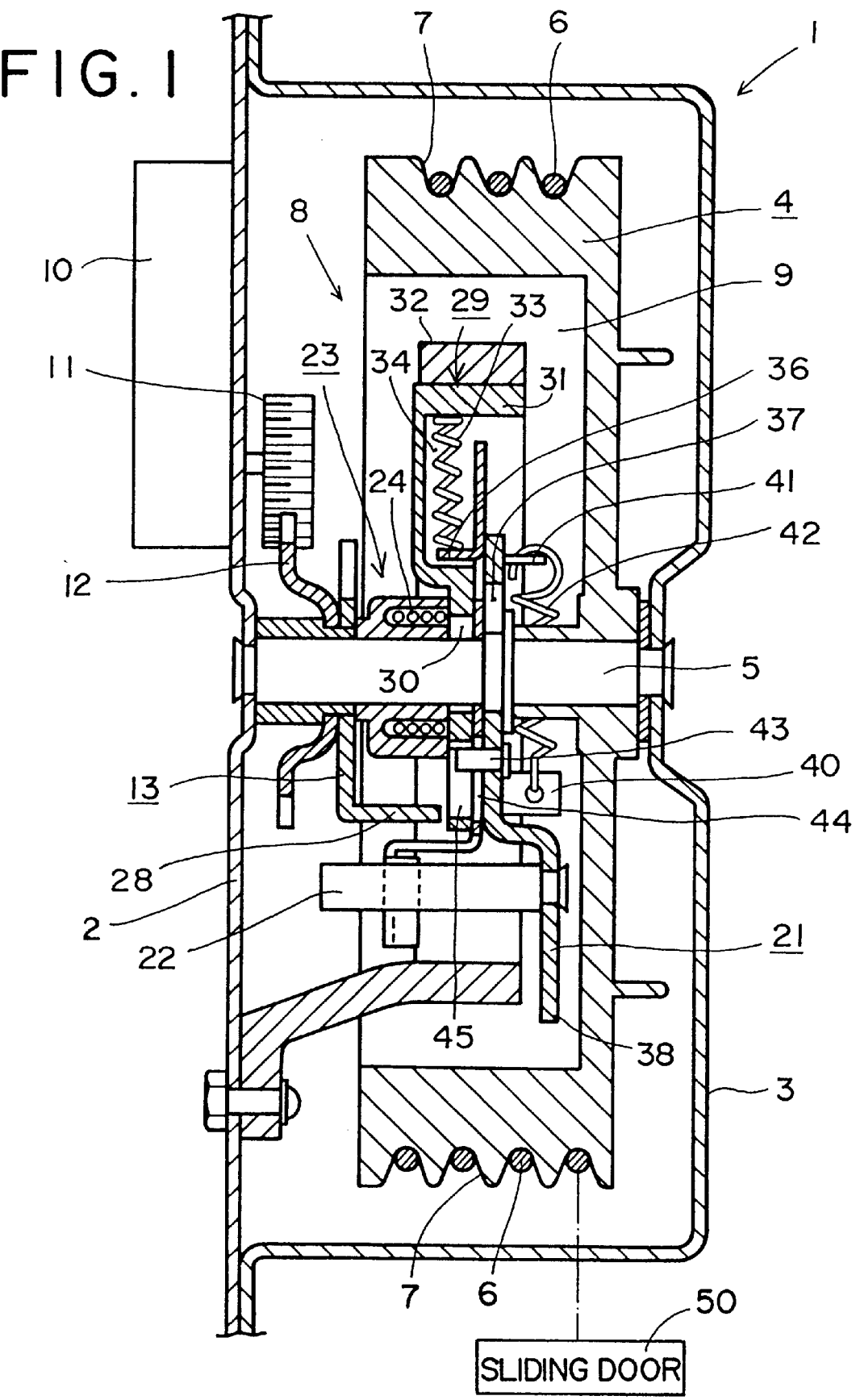
FIG. 1 is a longitudinal sectional view of a power transmitting apparatus in accordance with the present invention.

One embodiment of the present invention will be described with reference to the accompanying drawings. A power transmitting apparatus 1 in accordance with the present invention, which is shown in the accompanying drawings, is designed as an apparatus for transmitting power from an electric motor to a vehicle sliding door so as to move the sliding door in door opening and door closing directions. The transmitting apparatus 1 has a metallic base plate 2 fixed to a vehicle body, a cover plate 3 fixed to the base plate 2, and a cylindrical drum 4 provided between the plate 2 and plate 3 by a shaft 5. Each end of the shaft 5 is fixed to the plates 2 and 3, respectively.

The drum 4 has, on its annular outer surface, a wire groove 7 in which a wire 6 connected to the sliding door 50 is wound. Inside of the drum 4 is formed an inner space 9 in which a clutch mechanism 8 is provided. A motor 10 is fixed to the base plate 2. Although described in detail later, the power of the motor 10 is transmitted to the drum 4 via the clutch mechanism 8, and when the wire 6 is wound or let out by the rotation of the drum 4, the sliding door 50 slides in the door closing direction or the door opening direction.

Figure 4:
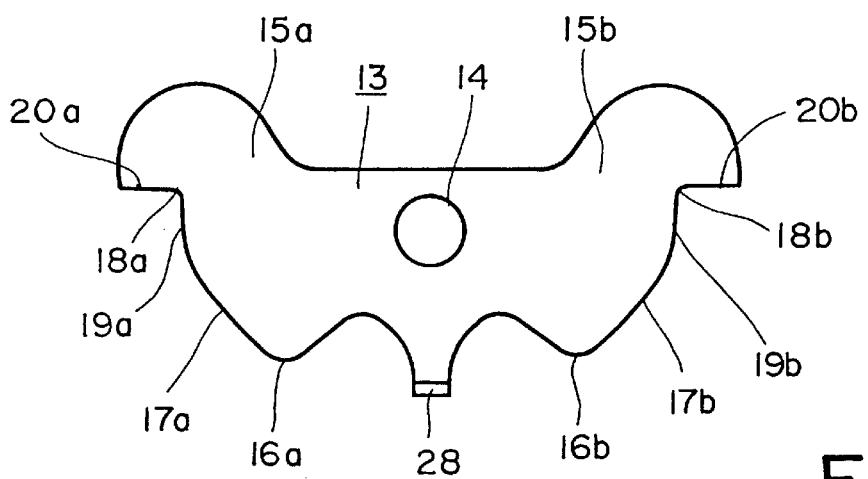
FIG. 4 is a plan view of a cam member.

A motor gear 11 of the motor 10 is meshed with an input gear 12 rotatably installed to the shaft 5. A cam member 13, as best shown in FIG. 4, is fixed to the input gear 12, and has at its center a hole 14 into which the shaft 5 is inserted. The cam member 13 has a pair of wing portions 15a and 15b extending toward both sides of the hole 14. Each of the wing portions 15a, 15b has one of cam faces 17a, 17b and one of arcuate holding faces 19a, 19b formed with the hole 14 being the center. Each radius of the cam faces 17a, 17b measured from the hole 14 increases gradually from the corresponding one of ends 16a, 16b to the corresponding one of the holding faces 19a, 19b. Engagement faces 20a, 20b perpendicular to the holding face 19a, 19b are formed at ends 18a, 18b of the holding faces 19a, 19b, respectively. The cam member 13 is formed with a bent portion 28 extending in the axial direction of the shaft 5.

Figure 8:
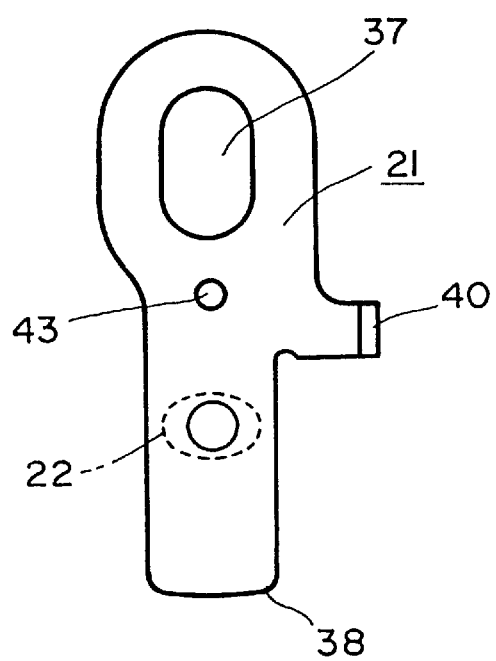
FIG. 8 is a plan view of a clutch member.

A clutch member 21 which is best shown in FIG. 8 is formed with an elongated hole 37 into which the shaft 5 is inserted, so that the clutch member 21 can slide a distance equal to a clearance formed between the elongated hole 37 and the shaft 5. The clutch member 21 has a contact pin 22 which is capable of being in contact with the cam faces 17a and 17b of the cam member 13. When the cam member 13 is rotated by the power of the motor 10, either of the cam faces 17a and 17b comes in contact with the contact pin 22 to move the clutch member 21 in a direction opposite to an arrow A, thereby the clutch member 21 is engaged with a protrusion 39 formed on the inner peripheral surface of the drum 4.

Figure 3:
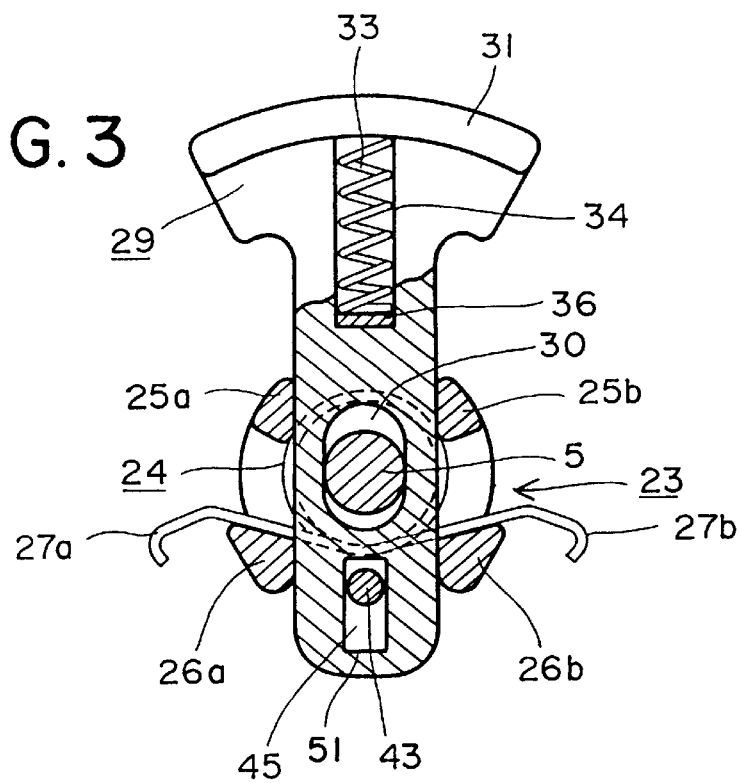
FIG. 3 is a partially sectional view of a support member and a brake member.
Figure 5:
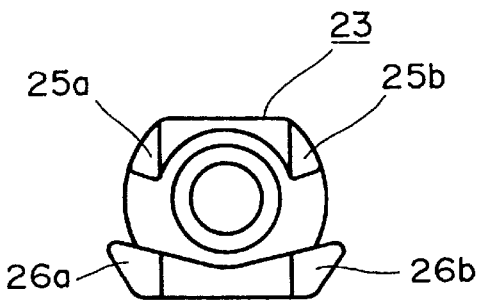
FIG. 5 is a plan view of the support member.

A cylindrical support member 23 which is shown in FIGS. 1, 3 and 5 is rotatably installed to the shaft 5. The support member 23 contains a coil portion of a cancelling spring 24 therein. The support member 23 is integrally formed with four columns 25a, 25b, 26a, and 26b extending in parallel with the axis of the shaft 5. A pair of legs 27a and 27b of the cancelling spring 24 are in elastic contact with the rear-side columns 26a and 26b, respectively. The legs 27a and 27b extend in the radial direction of the shaft 5 so as to come into contact with the bent portion 28 of the cam member 13 when the cam member is rotated by the motor 10.

A brake member 29 is slidably installed between the right columns 25a, 26a and the left columns 25b, 26b of the support member 23. The brake member 29 is formed with an elongated hole 30 into which the shaft 5 is inserted. The brake member 29 and the support member 23 rotate integrally around the shaft 5. The brake member 29 is urged in the direction of the arrow A by the resilient force of a brake spring 33 contained in a concave portion 34 of the brake member 29. At one end of the brake member 29 is formed an arcuate brake shoe 31 which is brought into contact with a brake ring 32 fixed to the base plate 2 by the resilient force of the brake spring 33 so as to produce a frictional resistance.

Figure 6:
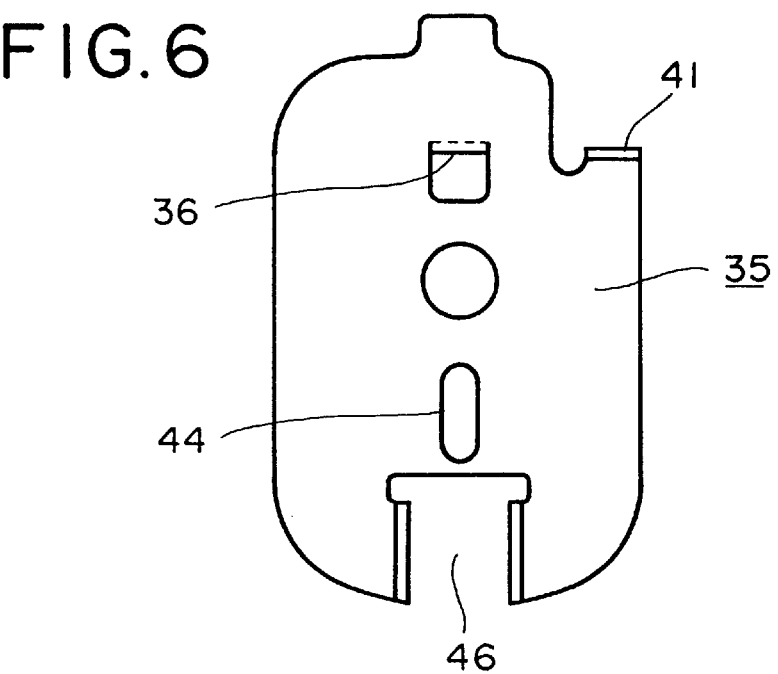
FIG. 6 is a plan view of an intermediate plate.
Figure 7:
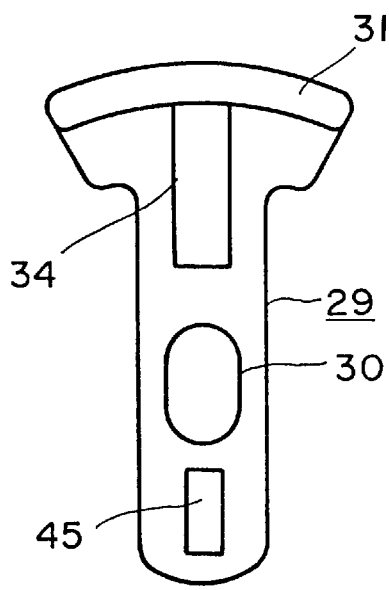
FIG. 7 is a plan view of the brake member.

An intermediate plate 35 which is best shown in FIG. 6 is rotatably installed to the shaft 5. The intermediate plate 35 has a bent piece 36 which is positioned in one end of the concave portion 34, and which is in contact with one end of the brake spring 33. The intermediate plate 35 is rotated integrally with the brake member 29 by the engagement between the concave portion 34 and the bent piece 36.

A return spring 42 is provided between a bent portion 40 of the clutch member 21 and a bent portion 41 of the intermediate plate 35 so that the clutch member 21 is urged in the direction of the arrow A by the resilient force of the return spring 42. The clutch member 21 ha an engagement pin 43 which passes through an elongated hole 44 of the intermediate plate 35 and engages with an elongated slot 45 of the brake member 29. When the clutch member 21 is in a standby position shown in FIG. 2, the engagement pin 43 is positioned in the upper side of the elongated slot 45 as shown in FIGS. 1 and 3. The brake member 29 and the clutch member 21 are connected to each other so as to be rotated integrally by the engagement between the elongated slot 45 and the engagement pin 43, therefore the frictional resistance produced by the contact between the brake shoe 31 and the brake ring 32 is transmitted to the clutch member 21.

Figure 2:
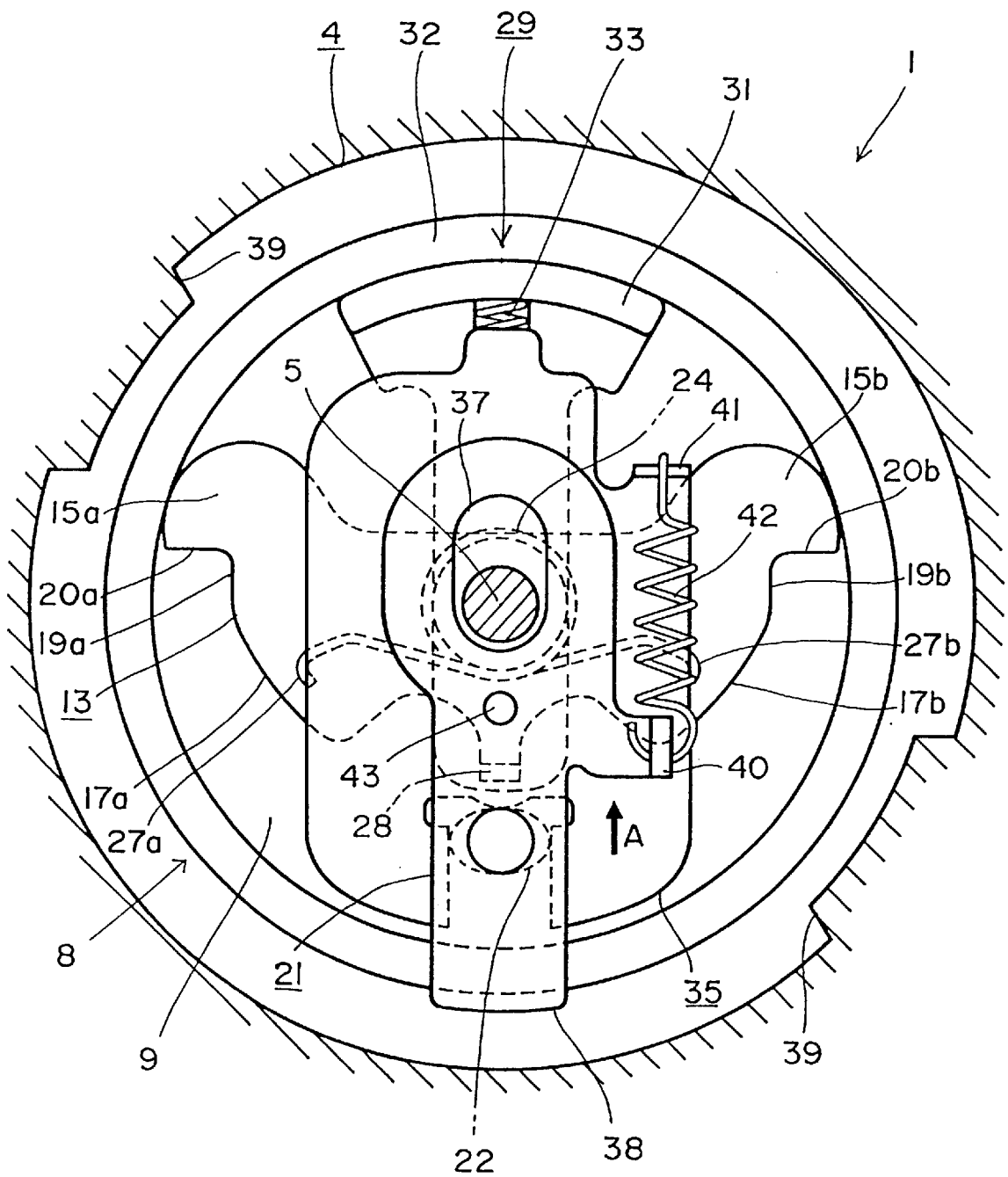
FIG. 2 is a transverse sectional view of the power transmitting apparatus.
Figure 9:
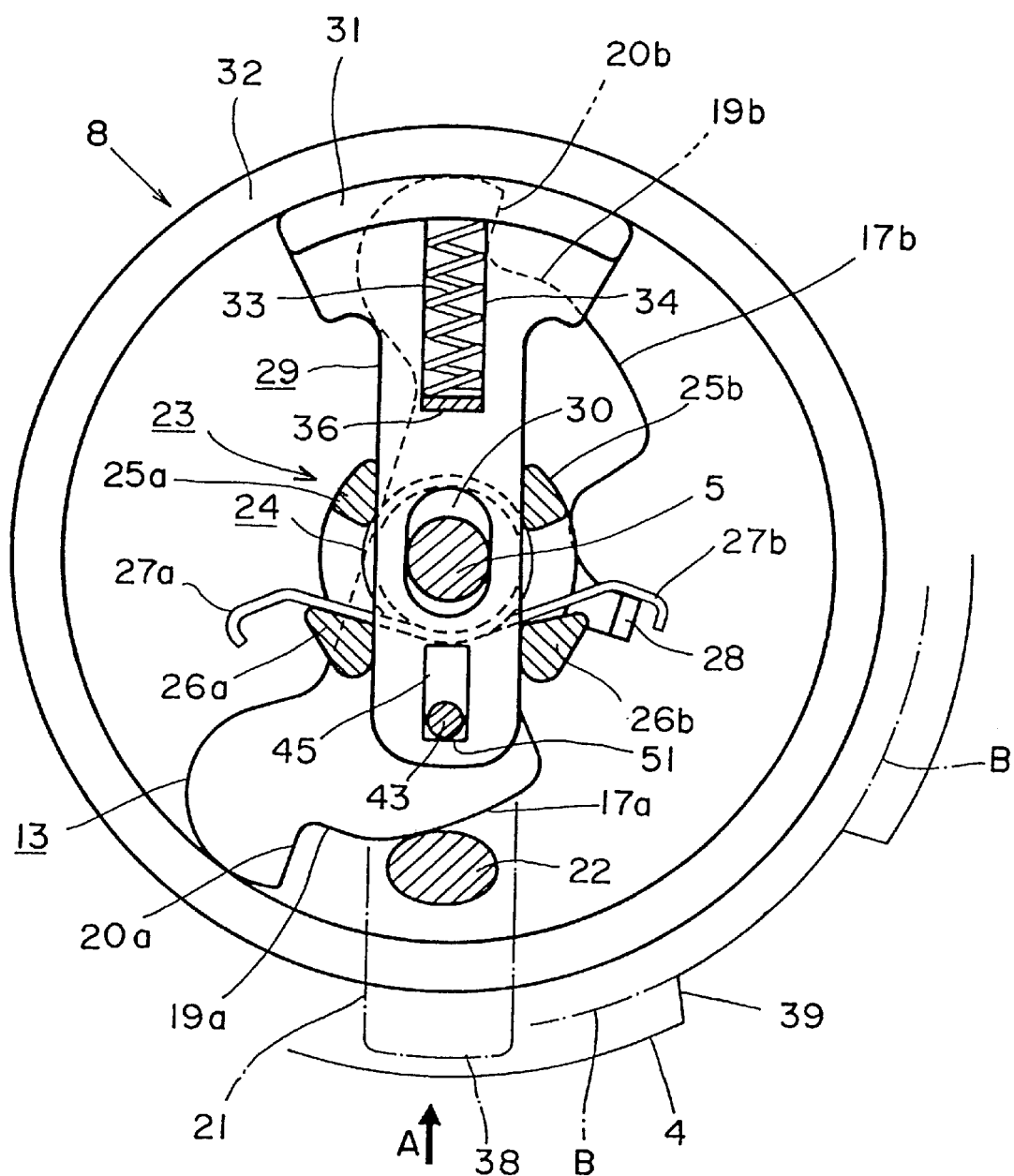
FIG. 9 is a view showing a state in which the clutch member has moved from a standby position to an initial engagement position.

The clutch member 21, to which the frictional resistance is given by the brake member 29, moves in the direction opposite to the arrow A against the return resilient force of the spring 42 when one of the cam face 17a, 17b comes into contact with the contact pin 22 of the clutch member 21, and a clutch claw 38 which is formed at the lower tip end of the clutch member 21 is displaced from the standby position shown in FIG. 2 to an initial engagement position shown in FIG. 9 beyond the movement locus B of the protrusions 39 of the drum 4. Also, when the clutch member 21 is moved to the initial engagement position, the engagement pin 43 of the clutch member 21 is just brought into contact with a lower surface 51 of the elongated slot 45 of the brake member 29. Although the detailed principle is described later, when the clutch member 21 is moved from the initial engagement position to a full engagement position shown in FIG. 10, the brake member 29 moves in the direction opposite to the arrow A by the engagement of the engagement pin 43 with the lower surface 51 and is displaced to a non-braking position where the brake shoe 31 separates from the brake ring 32, thereby the frictional resistance is not produced in the full engagement state.

The both sides of the intermediate portion of the contact pin 22 are slidably supported by a guide groove 46 of the intermediate plate 35.

Next, the operation of the power transmitting apparatus will be described.

When power is not supplied to the motor 10, as shown in FIG. 2, the clutch member 21 is held at the standby position by the resilient force of the return spring 42, the brake shoe 31 of the brake member 29 is brought into contact with the brake ring 32 by the resilient force of the brake spring 33, and the frictional resistance produced by the contact between the brake shoe 31 and the brake ring 32 is transmitted to the clutch member 21 via the engagement between the engagement pin 43 and the elongated slot 45.

When the cam member 13 is rotated counterclockwise by the motor 10 in the state shown in FIG. 2, the cam face 17a of the cam member 13 comes into contact with the contact pin 22 of the clutch member 21. Then, since the rotation of the clutch member 21 is restricted by the frictional resistance due to the brake member 29, the clutch member 21 is pushed out in the direction opposite to the arrow A against the resilient force of the return spring 42, being displaced to the initial engagement position shown in FIG. 9, and at the same time, the engagement pin 43 of the clutch member 21 comes into contact with the lower surface 51 of the elongated slot 45 of the brake member 29. Also, the bent portion 28 of the cam member 13 comes into contact with the leg 27b of the cancelling spring 24.

When the cam member 13 is further rotated counterclockwise, the clutch member 21 is pushed out in the direction opposite to the arrow A beyond the initial engagement position, and the brake member 29 is also moved in the direction opposite to the arrow A by the contact between the engagement pin 43 and the lower surface 51 of the elongated slot 45, then the frictional resistance produced by the contact between the brake shoe 31 and the brake ring 32 is gradually decreased. When the frictional resistance is weaker than the elastic force of the return spring 42, the clutch member 21 cannot be moved in the direction opposite to the arrow A, so that the clutch member 21 begins to rotate around the shaft 5 together with the cam member 13 and brake member 29. Also, by the stopping of the movement of the clutch member 21 in the direction opposite to the arrow A, the decrease in frictional resistance is also stopped. When the rotation of the clutch member 21 continues in this state, the clutch claw 38 of the clutch member 21 comes into contact with the protrusion 39 of the drum 4.

Figure 10:
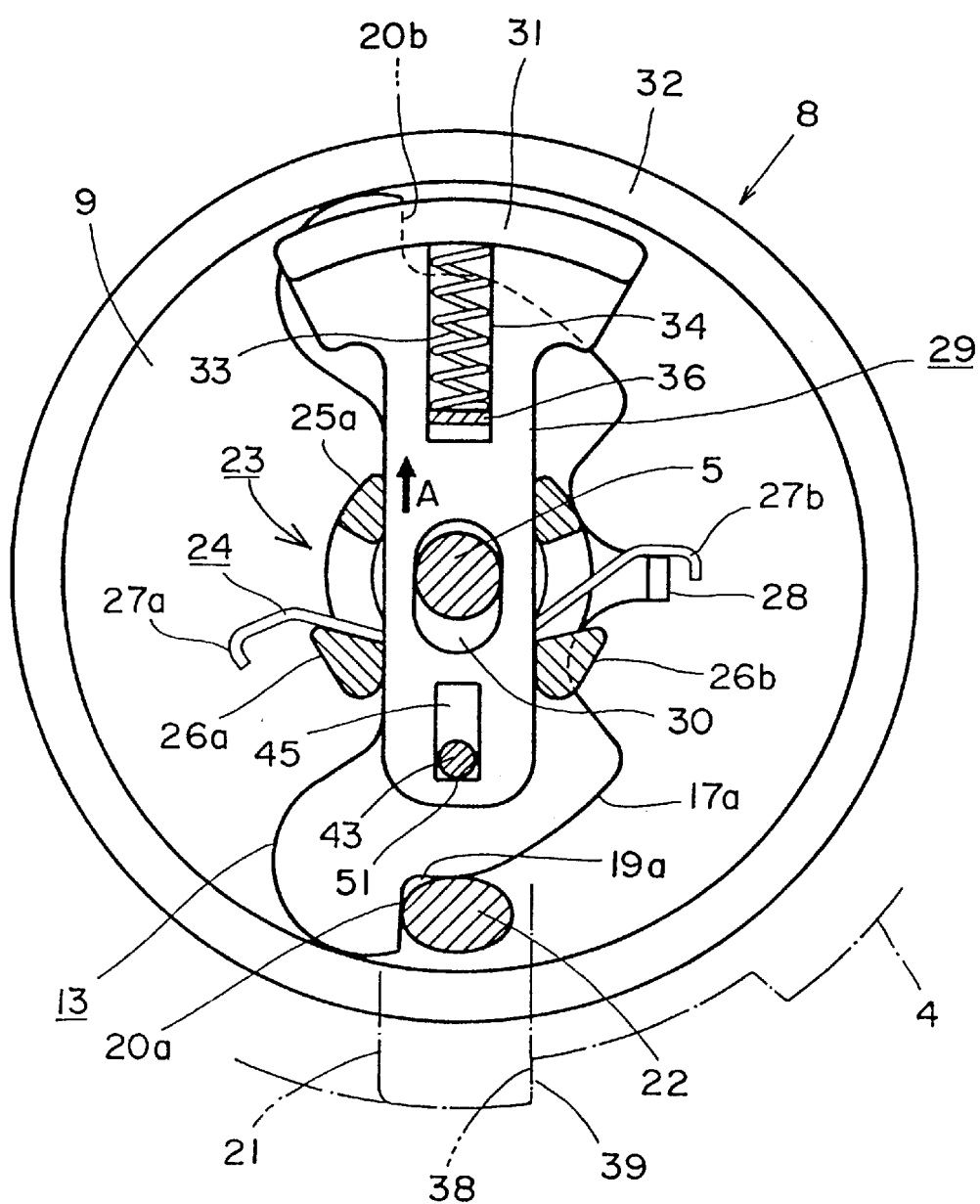
FIG. 10 is a view showing a state in which the clutch member has moved to a full engagement position.

When the clutch claw 38 of the clutch member 21 comes into contact with the protrusion 39, a rotational resistance for rotating the drum 4 is given to the clutch member 21, so that the clutch member 21 is again moved in the direction opposite to the arrow A against the elastic force of the return spring 42, being displaced to the full engagement position shown in FIG. 10. The brake member 29 is also moved in the direction opposite to the arrow A, so that the brake shoe 31 is completely separated from the brake ring 32. Further, the cancelling spring 24 is wound up by the engagement between the leg 27b and the bent portion 28 of the cam member 13. When this state is reached, the contact pin 22 of the clutch member 21 transfers form the cam face 17a of the cam member 13 to the holding face 19a, and comes into contact with the engagement face 20a of the cam member 13. Thereby, the subsequent rotational force of the cam member 13 is transmitted to the clutch member 21 via the engagement between the engagement face 20a and the contact pin 22, and the rotational force of the clutch member 21 is transmitted to the drum 4 via the engagement between the clutch claw 38 and the protrusion 39, thereby the wire 6 is moved to move the sliding door 50 as a movable member. Thus, the power of the motor 10 is transmitted to the drum 4.

In the present invention, an unnecessary resistance is not given to the motor 10 during the rotation of the drum 4, so that the power of the motor 10 is effectively transmitted to the drum 4. That is to say, when the clutch member 21 is slid to a predetermined position, the brake member 29, which gives the rotational resistance to the clutch member 21, is moved to the non-braking position where the frictional resistance is not produced, so that the resistance of the brake member 29 does not act on the motor 10.

Further, during the time when the pin 22 of the clutch member 21 is in contact with the cam face 17a of the cam member 13, the resilient force of the brake spring 33 acts as a force for rotating the cam member 13 in the reverse direction, so that the resilient force of the brake spring 33 acts as the rotational resistance to the motor 10. In the present invention, however, when the clutch member 21 is moved to the full engagement position, the contact pin 22 of the clutch member 21 engages with or steps onto the holding face 19a formed with the shaft 5 being the center, so that the resilient force of the brake spring 33 cannot rotate the cam member 13 in the reverse direction. Therefore, the resilient force of the brake spring 33 does not act as the resistance to the motor 10. Also, the resilient force of the return spring 42 does not act as the resistance to the motor 10 on the same principle.

When the movement of the movable member such as the sliding door 50 is finished and the motor 10 is turned off, the cancelling spring 24, which has been wound up by the bent portion 28, slightly rotates the cam member 13 clockwise in FIG. 10, by which the contact pin 22 is separated from the holding face 19a and is brought into contact with the cam face 17a. When this state is reached, the clutch member 21 is moved in the direction of the arrow A while the clutch member 21 relatively rotates the cam member 13 by the resilient force of the return spring 42 (and the brake spring 33), then the clutch member 21 is returned to the standby position and the brake shoe 31 of the brake member 29 comes into contact with the brake ring 32.

The power transmitting apparatus in accordance with the present invention can be applied to various types of movable members such as a vehicle window glass, retractable head lamp, and seat, as well as a sliding door.

What is claimed is:

1. An apparatus for transmitting power from a motor to a movable member comprising:

a first member to be connected to the movable member;

a second member to be connected to the motor and rotated around a center shaft when the motor rotates;

a clutch member for transmitting rotation of the second member to the first member by an engagement with the first member, said clutch member being displaceable from standby position where the clutch member is not engaged with the first member to a full engagement position where the clutch member is fully engaged with the first member through an initial engagement position where the clutch member is initially engaged with the first member by rotary movement therefor relative to the second member;

a return spring for urging the clutch member from the full engagement position toward the standby position; and a brake member for applying a predetermined frictional resistance to the clutch member, said brake member being displaceable between a braking position where the frictional resistance is produced and a non-braking position where the frictional resistance is not produced, said frictional resistance being effective to cause an initial rotary movement of the clutch member relative to the the second member to displace the clutch member from the standby position to the initial engagement position against a resilient force of the return spring when the second member is rotated;

wherein an initial engagement between the clutch member and the first member is effective to cause further rotary movement of the clutch member relatively to the second member to displace the clutch member toward the full engagement position;

wherein said clutch member moves the brake member from the braking position to the non-braking position when said clutch member is moved from the initial engagement position toward the full engagement position.

2. An apparatus according to claim 1, wherein said brake member is held at the braking position by a resilient force of a brake spring.

3. An apparatus according to claim 2, wherein said second member has a cam face which moves the clutch member from the standby position to the full engagement position by a contact with the clutch member and a holding face which is communicated with the cam face and disables the clutch member from returning from the full engagement position to the standby position.

4. An apparatus according to claim 3, wherein said holding face is an arcuate face formed with the center shaft being the center.

5. An apparatus according to claim 4, wherein said clutch member is moved in the radial direction of the center shaft.

6. An apparatus according to claim 4, further comprising a cancelling spring which is compressed by the second member when the second member is rotated by the motor, wherein said cancelling spring rotates the second member relatively in a reverse direction to separate the clutch member from the holding face.

\* \* \* \* \*